D. H. Shirley,
Piano Action.
No 405.
Reissued Oct. 21, 1856.
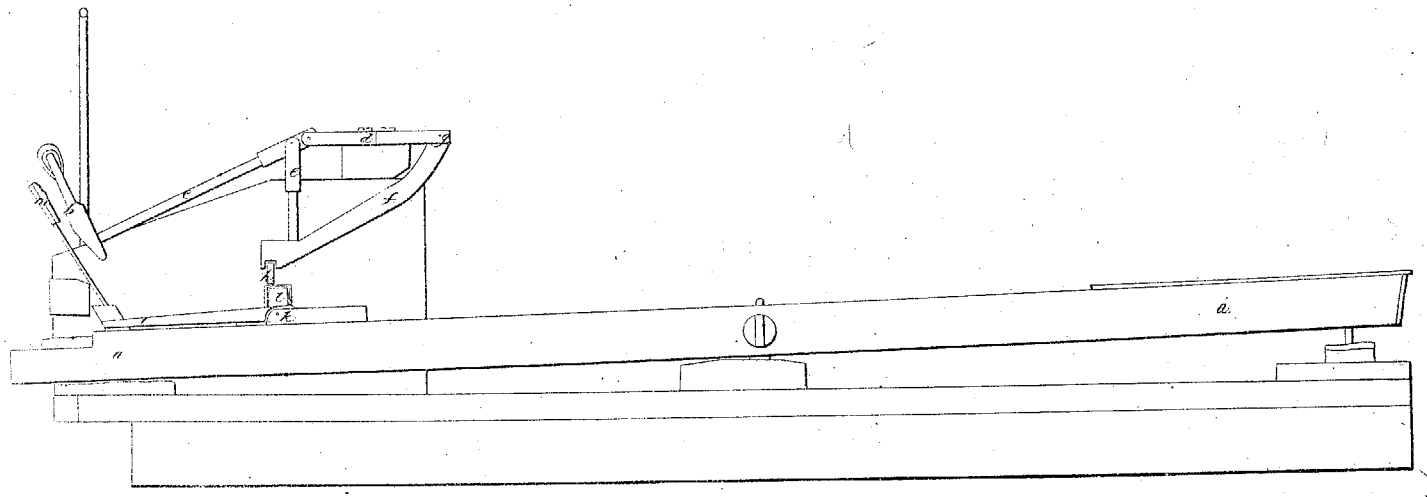

UNITED STATES PATENT OFFICE.

DANIEL H. SHIRLEY, OF BOSTON, MASSACHUSETTS.

PIANO-FORTE ACTION.

Specification forming part of Letters Patent No. 12,003, dated November 28, 1854; Reissue No. 405, dated October 21, 1856.

*To all whom it may concern:*

Be it known that I, DANIEL H. SHIRLEY, of Boston, in the county of Suffolk and State of Massachusetts, have invented an Improved Piano-Forte Action or String-Sounding Mechanism, which I do hereby declare is fully described and represented in the following specification and the accompanying drawings, wherein such is exhibited as applied to a piano-forte hammer and its key-lifter.

To so simplify a piano-forte action as to render it cheap in construction, to prevent "blocking" of the hammer at improper times, to avoid, as far as possible, the necessity of regulating or readjusting the operative parts with respect to one another, and at the same time to obtain a powerful action and secure to it ease of operation and delicacy of touch are some of the objects which I have aimed at and have secured in the action or mechanism containing my improvement. In the same the jack or fly as commonly used in piano-forte actions is dispensed with, the devices employed for elevating the hammer being so arranged and actuated as to always maintain upon the key-lever the weight of said hammer while it is in action, the same rendering the hammer sensible to the slightest downward movement of the key in whatever position it may be when so moved or is made to receive a blow or downward pressure from the finger of the performer. Furthermore, by my improvement the back catch of the hammer will be operated to great advantage so far as concerns arresting the movement of the hammer after a blow from it upon its string has been produced.

*a a* in the drawings represent the key-lever; *b*, the hammer, and *c* its arm, which is hinged to the hammer-rail *d* in the usual way.

Hinged to the hammer-arm or otherwise properly applied to it, and near the rail *d*, is a short vertical post or arm, *e*, (or its equivalent,) which is connected to an inclined arm or lever, *f*, that should play vertically on a fulcrum or pin disposed as seen at *g*, the same being arranged on the extension of the rail *d*, or in a separate supporting-piece of rail. To the other end of the arm *f* a small block, *h*, having its lower edge beveled, is applied, so as to rest on and operate in connection with a lifter or butt, *l*, which is fastened on a lever, *i*, that is hinged to the key-lever *a*, or turns upward and downward upon a pin arranged as shown at *k*, and within a projection from the lever *a a*. The other end of the lever *i* supports the back catch, *m*, whose shank extends upward from it, and in respect to the hammer as shown in the drawings.

When the key is struck for the purpose of elevating the hammer, the butt or lifter *l* will act against the small block, *h*, in such manner as raise it, whereby the inclined arm *f* and the hammer will be forced upward simultaneously, so as to cause the hammer to approach and give a blow to its string.

By reason of the peculiar manner in which the hammer is applied to the lifter or butt *l* the weight of the hammer will be maintained on the butt during such time as it may be desirable to elevate the hammer toward the string, the same rendering the hammer very susceptible to any upward or downward movement of the key-lever. By reason of the butt *l* and the back catch, *m*, being connected with the key-lever by a separate lever, *i*, the back catch, immediately after a blow from the hammer against the string, will be elevated, so as to hold and arrest the hammer or prevent it from rising until the front end of the key-lever is again struck downward, the back catch being raised by the action of the block *h* against the adjacent corner of the lifter *l* at or near the termination of the upward movement of the said lifter.

By the above-described or equivalent arrangement of the aforementioned devices for operating the hammer it will be seen that when they are once properly adjusted to one another little or no readjustment of them will ever be necessary under ordinary circumstances. As the arm *f* always serves to maintain the block *h* in proper position on the lifter *l*, the hammer is kept in readiness for a blow, whatever may be its position relatively to the string. The advantage of this when a note is to be repeated, "trilling" to be effected, or a powerful blow given to the string readily will be apparent, the possibility of improperly blocking the hammer being effectually guarded against.

I claim—

The above-described peculiar manner in which the back catch, *m*, and the lifter *l* or its equivalent are combined together and with the key-lever—viz., by a lever, *i*, hinged to the key-lever, and fastened to both back catch and lifter, the whole being substantially in manner as hereinbefore set forth.

In testimony whereof I hereunto set my signature this 8th day of August, A. D. 1856.

D. H. SHIRLEY.

Witnesses:

R. H. EDDY,

ARTHUR NEILE.